UNITED STATES PATENT OFFICE.

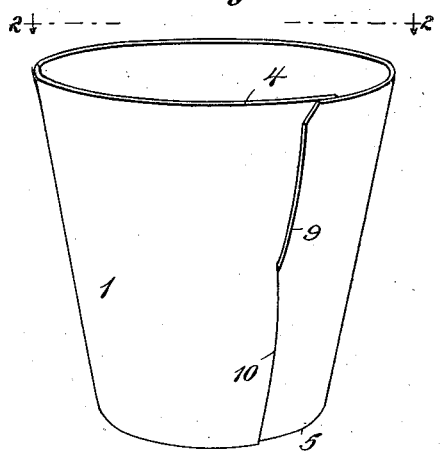
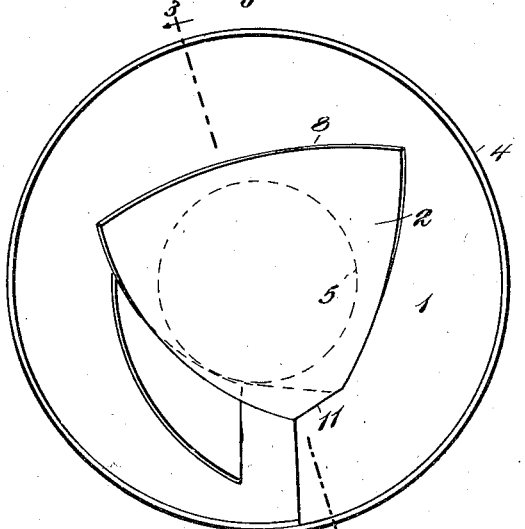
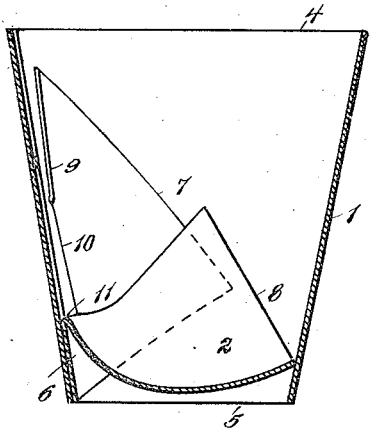
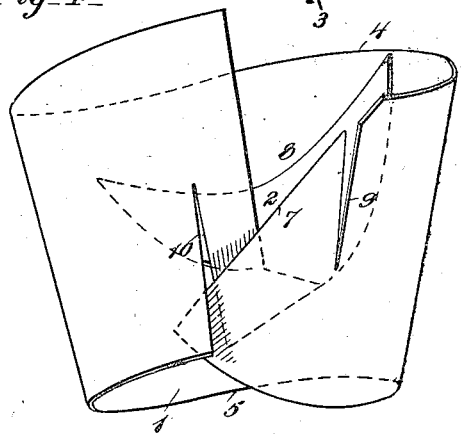
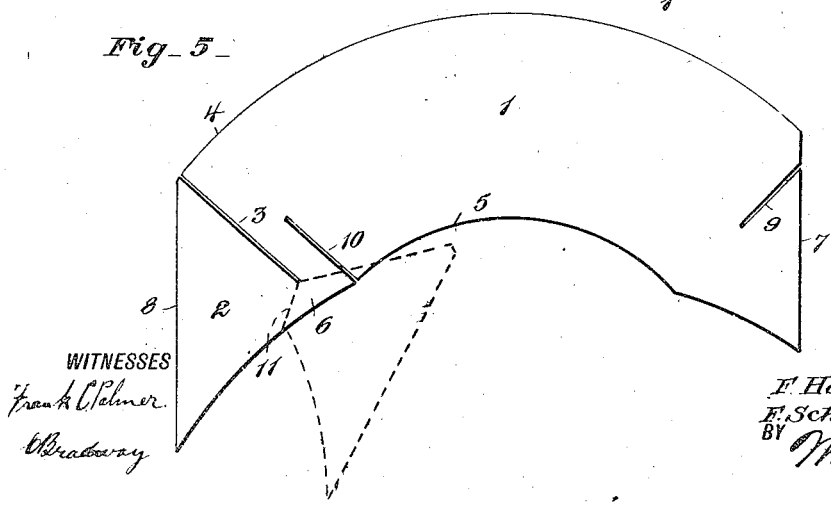

FREDERICK HOLTKE AND FREDRICK SCHAFFERT, JR., OF CARLSTADT, NEW JERSEY.

FLOWER-POT.

1,201,823.

Specification of Letters Patent.

Patented Oct. 17, 1916.

Application filed April 6, 1916. Serial No. 89,321.

*To all whom it may concern:*

Be it known that we, FREDERICK HOLTKE and FREDRICK SCHAFFERT, Jr., citizens of the United States and residents of Carlstadt, in the county of Bergen and State of New Jersey, have invented a new and Improved Flower-Pot, of which the following is a full, clear, and exact description.

This invention relates to flower pots and has to deal particularly with flower pots of the knock-down type made of flexible material which can be formed into the desired shape for holding earth and plants.

The invention has for its general objects to improve the construction of articles of the character referred to so as to be reliable and efficient in use, comparatively simple and inexpensive to manufacture, and so designed as to have superior advantages over other knock-down, flat or collapsible flower pots heretofore in use.

A more specific object of the invention is the provision of a flower pot made from a single blank which constitutes the body and bottom of the pot, the ends of the blank having novel interlocking means whereby the flower pot will be positively maintained in set-up condition indefinitely and yet the ends can be readily unlocked for permitting the flower pot to be unfolded into flat form whenever desired.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a perspective view of the flower pot set up for use; Fig. 2 is a plan view drawn on an enlarged scale and seen from the plane 2—2, Fig. 1; Fig. 3 is a vertical sectional view on the line 3—3, Fig. 2, and drawn on a reduced scale; Fig. 4 is a perspective view of the blank with the ends about to be interlocked; and Fig. 5 is a plan view of the blank from which the flower pot is made.

Referring to the drawing, the flower pot is constructed from a single piece blank formed substantially as shown in Fig. 5, the material being any pliable, tough, waterproof stock, such as roofing felt or cloth, and the blank is so designed that there is a minimum waste of material in cutting the blanks from strip stock.

The blank comprises an arcuate body portion 1 and an approximately triangular bottom portion 2 separated from the body portion 1 by an approximately radial slit 3, whereby the end of the body blank is formed. This slit 3 extends downwardly from the top edge 4 and terminates short of the bottom edge 5, so as to leave an integral connecting portion at 6 between the body and bottom sections 1 and 2 of the blank. The opposite end edge 7 of the body portion 1 is parallel with the edge 8 of the bottom section 2, and these edges 7 and 8 are parallel with a central line passing longitudinally of the strip from which the blanks are cut. The edge 7 has an oblique slit 9 extending downwardly toward but terminating considerably short of the bottom edge 5, and this slit 9 is approximately radial with respect to the curvature of the body portion 1.

At the bottom edge of the blank and at the end opposite the end 7 is an upwardly extending approximately radial slit 10 which serves to interlock in the slit 9, whereby the ends of the body section 1 will be fastened together in overlapping relation. After the ends are connected, the bottom section 2 is bent down out of its normal plane so as to form a closure for the open bottom of the body, as clearly shown in Figs. 2 and 3, the bottom section 2 being bent on the line 11. The edges of the triangular bottom section 2 do not tightly fit the internal surface of the body section, so that ample provision is provided for drainage. The flower pot can be set up or knocked down with great despatch and ease, and no fastenings whatever are required, as simply the interlocking of the slits 9 and 10 is required. By reason of the arcuate form of the blank, the flower pot when set up will be of frusto-conical form, so as to possess the well-known advantages of other flower pots.

The bottom end of the body of the pot is of circular form, and the bottom 2 is triangular, but of such dimensions that when the bottom is pressed downwardly and given a concave form, as shown in Fig. 3, the corners of the triangular bottom are disposed high up within the body of the pot, and in contact with the internal surface thereof, so that the weight of the earth in the pot cannot by any chance turn the bottom 2 downwardly out of the pot. As shown in Fig. 2, a diametrical line extending from either side of the triangular bottom 2 to the angle opposite is of greater length than the diameter of the open bottom of the body of the pot, so that the bottom 2 cannot be crowded downwardly out of the body. The earth produces a lateral as well as a downward pressure on the bottom 2, so that the latter is held frictionally clamped against the internal surface of the body.

From the foregoing description taken in connection with the accompanying drawing, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claims.

Having thus described our invention, we claim as new and desire to secure by Letters Patent:

1. A collapsible flower pot blank comprising a strip of pliable material of arcuate form and having substantially parallel end edges, a radial slit extending inwardly from the outer corner at one end of a point in close proximity to the inner edge of the strip, whereby a triangular member is formed at the end of the strip to constitute the bottom of the flower pot, a radial slit adjacent the first-mentioned slit and extending outwardly from the inner edge to a point adjacent the longitudinal medial line of the strip, and a radial slit in the opposite end and extending inwardly to a point adjacent the medial longitudinal line and adapted to interlock with the second-mentioned slit to hold the ends of the blank together and to permit the said triangular member to be positioned within the flower pot body.

2. A collapsible flower pot made from a single-piece strip of arcuate form, said strip being divided by a slit extending almost entirely across the strip to divide the strip into an arcuate body portion and a polygonal bottom portion, and means at the ends of the body portion for connecting said ends together, whereby the flower pot will be of frusto-conical form, the diameter of the bottom of the pot being such compared with the said polygonal bottom portion, that the latter is dished downwardly in the body of the flower pot and the corners of the polygonal portion are in frictional contact with the inner surface of the body of the flower pot.

FREDERICK HOLTKE.
FREDRICK SCHAFFERT, Jr.

Witnesses:
JAMES S. LIDDLE,
THOS. J. ALEXANDER.